US011362523B2

(12) United States Patent
Chen et al.

(10) Patent No.: US 11,362,523 B2
(45) Date of Patent: Jun. 14, 2022

(54) CHARGING METHOD AND APPARATUS FOR MULTIPLE CELLS, AND ELECTRONIC DEVICE

(71) Applicant: GUANGDONG OPPO MOBILE TELECOMMUNICATIONS CORP., LTD., Guangdong (CN)

(72) Inventors: Shebiao Chen, Guangdong (CN); Jun Zhang, Guangdong (CN); Jialiang Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 152 days.

(21) Appl. No.: 16/781,977

(22) Filed: Feb. 4, 2020

(65) Prior Publication Data
US 2020/0203964 A1    Jun. 25, 2020

Related U.S. Application Data

(63) Continuation of application No. PCT/CN2018/122806, filed on Dec. 21, 2018.

(51) Int. Cl.
*H02J 7/00*  (2006.01)
*H02J 7/02*  (2016.01)

(52) U.S. Cl.
CPC .......... *H02J 7/0024* (2013.01); *H02J 7/0016* (2013.01); *H02J 7/0019* (2013.01); *H02J 7/02* (2013.01)

(58) Field of Classification Search
USPC ........................................................ 320/116
See application file for complete search history.

(56) References Cited

U.S. PATENT DOCUMENTS

| 6,232,744 B1* | 5/2001 | Kawai ................. G01R 31/396 320/132 |
| 2009/0079385 A1* | 3/2009 | Xiao ....................... H02M 3/07 320/102 |
| 2012/0007557 A1 | 1/2012 | Hayashigawa |
| 2012/0112685 A1 | 5/2012 | Hartley et al. |

(Continued)

FOREIGN PATENT DOCUMENTS

| CN | 105048602 A | 11/2015 |
| CN | 105896670 A | 8/2016 |

(Continued)

OTHER PUBLICATIONS

Japanese Office Action with English Translation for JP Application 2020-509461 dated Apr. 16, 2021. (16 pages).

(Continued)

*Primary Examiner* — Samuel Berhanu
(74) *Attorney, Agent, or Firm* — Young Basile Hanlon & MacFarlane, P.C.

(57) ABSTRACT

Embodiments of the present disclosure provide a charging method for multiple cells. The method includes: converting a received charging voltage to obtain a converted charging voltage; and charging multiple cells connected in series with the converted charging voltage. The technical solution according to embodiments of the present disclosure reduces the charging current and the heat generated by a terminal during the charging process. Meanwhile, when the charging current remains the same, the charging voltage is increased, achieving fast charging.

18 Claims, 2 Drawing Sheets

(56) References Cited

U.S. PATENT DOCUMENTS

| | | | |
|---|---|---|---|
| 2012/0235641 A1 | 9/2012 | Yang | |
| 2013/0002202 A1* | 1/2013 | Kuraishi | H02J 7/0014 320/119 |
| 2013/0038290 A1 | 2/2013 | Chatroux et al. | |
| 2014/0199570 A1* | 7/2014 | Cho | H01M 10/488 429/93 |
| 2017/0117724 A1* | 4/2017 | Kong | H02J 7/0024 |
| 2017/0229897 A1* | 8/2017 | Ashrafzadeh | H02J 7/0013 |

FOREIGN PATENT DOCUMENTS

| | | | |
|---|---|---|---|
| CN | 105978049 A | 9/2016 | |
| CN | 108233451 A | 6/2018 | |
| CN | 108475931 A | 8/2018 | |
| JP | 2001186684 A | 7/2001 | |
| JP | 2003087991 A | 3/2003 | |
| JP | 2005185060 A | 7/2005 | |
| JP | 2008220121 A | 9/2008 | |
| JP | 2009247145 A | 10/2009 | |
| JP | 2012200126 A | 10/2012 | |
| KR | 20180040487 A | 4/2018 | |

OTHER PUBLICATIONS

Australian Examination Report for AU Application 2018432187 dated May 26, 2021. (4 pages).
Communication pursuant to Article 94(3) EPC for EP Application 18941098.8 dated Jun. 23, 2021. (4 pages).
Korean Office Action with English Translation for KR Application 10-2020-7005821 dated Jun. 30, 2021. (12 pages).
International Search Report with English Translation for PCT/CN2018/122806 dated Aug. 27, 2019.
Australia First Office Action for AU Application 2018432187 dated Jan. 21, 2021. (4 pages).
OA for IN application 202017002959 dated Oct. 5, 2020.
OA for EP application 18941098.8 dated Nov. 27, 2020.
European Communication pursuant to Article 94(3) EPC Examination for EP application 18941098.8 dated Jan. 3, 2022.

* cited by examiner

CHARGING METHOD AND APPARATUS FOR MULTIPLE CELLS, AND ELECTRONIC DEVICE

CROSS-REFERENCE TO RELATED APPLICATION(S)

This application is a continuation application of International Application No. PCT/CN2018/122806, filed on Oct. 12, 2018, the entire contents of which are incorporated herein by reference.

TECHNICAL FIELD

The present disclosure relates to the field of charging technology, and more particularly, to a charging method and apparatus for multiple cells, a computer readable medium and an electronic device.

BACKGROUND

At present, mobile terminals (e.g. smart phones) have brought great convenience to life, and are favored by more and more consumers. Since a considerable number of people use mobile terminals frequently, a considerable amount of power is consumed by the mobile terminal, and frequent charging is required.

In the existing solution, the mobile terminal is typically powered with a single cell structure.

In the case where the charging speed of the terminals becomes faster, the problem of heat generation becomes more serious.

Therefore, under the premise of ensuring the charging speed, how to reduce the heating of the terminal is a problem that needs to be solved urgently.

SUMMARY

According to embodiments of a first aspect of the present disclosure, a charging method for multiple cells is provided. The method includes: converting a received charging voltage to obtain a converted charging voltage; and charging multiple cells connected in series with the converted charging voltage.

According to embodiments of a second aspect of the present disclosure, a charging apparatus for multiple cells is provided. The apparatus includes a memory and a processor. The memory is configured to store instructions executable by the processor. The processor is configured to:

convert a received charging voltage to obtain a converted charging voltage; and charge the multiple cells connected in series with the converted charging voltage.

According to embodiments of a third aspect of the present disclosure, an electronic device is provided. The electronic device includes a first cell and a second cell connected in series, a conversion circuit, and an output circuit. The conversion circuit is configured to receive a charging voltage from an adapter, convert the charging voltage to obtain a converted charging voltage, and output the converted charging voltage to the first cell and the second cell. The output circuit is configured to reduce a total voltage outputted by the first cell and the second cell to a desired voltage of a terminal system of the electronic device, and output the desired voltage to the terminal system.

It should be understood that, the above general description and the following detailed description are intended to be illustrative and not restrictive.

BRIEF DESCRIPTION OF DRAWINGS

The accompanying drawings, which are incorporated in and constitute a part of this specification, illustrate embodiments consistent with the present disclosure and, together with the specification, serve to explain the principles of the present disclosure. Obviously, the drawings in the following descriptions are only part embodiments of the present disclosure, and for those skilled in the art, other drawings can be obtained according to these drawings without creative labor.

DETAILED DESCRIPTION

Figure 1:
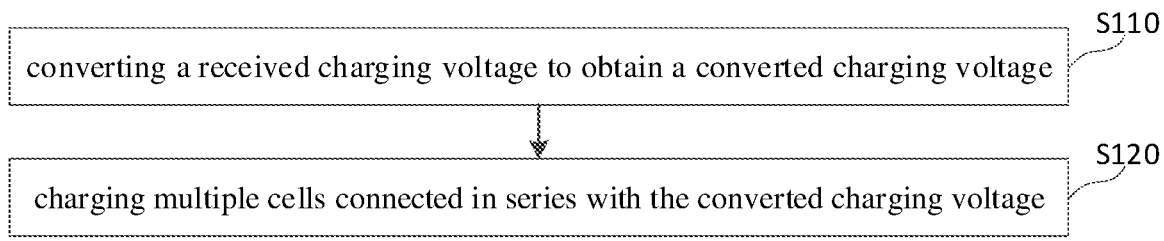
FIG. 1 is a flowchart of a charging method for multiple cells according to an embodiment of the present disclosure.

Example embodiments are described more comprehensively with reference to the accompanying drawings. However, example embodiments can be implemented in a variety of forms and should not be construed as being limited to the examples set forth herein. These embodiments are provided to make the present disclosure more comprehensive and complete, and the concept of the example embodiments are fully conveyed to those skilled in the art.

Furthermore, the described features, structures, or characteristics may be combined in any suitable manner in one or more embodiments. In the following description, numerous specific details are set forth. However, those skilled in the art appreciate that the technical solution of the present disclosure may be practiced without specifying one or more details, or other methods, components, devices, steps may be employed. In other instances, common methods, devices, implementations, or operations are not shown or described in detail to avoid obscuring aspects of the disclosure.

The block diagrams shown in the drawings are merely functional entities and do not necessarily have to correspond to physically separate entities. That is, these functional entities may be implemented in software, or implemented in one or more hardware modules or integrated circuits, or implemented in different networks and/or processors and/or microcontrollers.

The flowcharts shown in the drawings are merely illustrative, and not all of the contents and operations/steps are necessarily included, and steps are not necessarily implemented in the order described. For example, some operations/steps may be decomposed, and some operations/steps may be combined or partially merged, so the actual execution order may vary depending on the actual situation.

FIG. 1 is a flowchart of a charging method for multiple cells according to an embodiment of the present disclosure.

As illustrated in FIG. 1, the charging method for multiple cells according to an embodiment of the present disclosure includes the following acts.

At block S110, a received charging voltage is converted and a converted charging voltage is obtained.

At block S120, multiple cells connected in series are charged with the converted charging voltage.

The technical solution of the embodiment illustrated in FIG. 1 reduces the charging current and the amount of heat generated by the terminal during charging, and moreover, increases the charging voltage while the charging current remains the same, achieving fast charging.

The implementation details of the various acts illustrated in FIG. 1 are detailed below.

At block S110, a received charging voltage is converted and a converted charging voltage is obtained.

In an embodiment of the present disclosure, the received charging voltage may be converted by a charge pump to obtain the converted charging voltage.

In an embodiment of the present disclosure, based on the above solution, the method further includes: obtaining charging parameters of the multiple cells connected in series, in which the charging parameters include at least a voltage and a charging current of each single cell; feedbacking the charging parameters to a power supply device (e.g. an adapter), in which the charging parameters are used to instruct the power supply device to adjust an output voltage and/or an output current to meet a voltage and current required by the multiple cells connected in series. It should be noted that the charging parameters fed back to the power supply device correspond to the voltage and current required by the multiple cells connected in series. For example, the charge pump is configured to generate a voltage that is less than half of the input voltage, i.e., a half-voltage charge pump is used. When the single-cell voltage fed back to the power supply device is X volts, the power supply device adjusts the output voltage to 2X volts. For example, when the single-cell voltage fed back to the power supply device is 5 volts, the power supply device adjusts the output voltage to 10 volts.

In an embodiment of the present disclosure, after obtaining the converted charging voltage, the method further includes: determining a charging mode according to the converted charging voltage, specifically, determining a first charging mode when a voltage value of the converted charging voltage is a first voltage value, and determining a second charging mode when the voltage value of the converted charging voltage is a second voltage value, in which the first voltage value is greater than the second voltage value.

In an embodiment of the present disclosure, a terminal to be charged may be provided with a charging interface for connecting to an adapter through a data cable, or may be provided with a wireless charging module coupled to the adapter through coils. When the adapter is in operation, the voltage output by which to the mobile terminal (the terminal to be charged) is substantially constant, for example, 5V, 9V, 12V or 20V, and the voltage output by the adapter is converted by a conversion circuit in the mobile terminal (the terminal to be charged), to obtain a charging voltage and/or a charging current that can meet the requirements of the cells in the mobile terminal (terminal to be charged), in which the conversion circuit has a voltage/current feedback function to implement management of the charging voltage and the charging current. For example, when the voltage output by the adapter is greater than the charging voltage required by the cells in the mobile terminal (terminal to be charged), the voltage outputted by the adapter is stepped down by the above-mentioned conversion circuit, so that the processed voltage can meet the charging voltage requirements of the cells in the mobile terminal (terminal to be charged). Specifically, the above conversion circuit can be realized by a device such as a charge pump.

In an embodiment of the present disclosure, the type of the charging interface is not limited. For example, it may be a Universal Serial Bus (USB) interface, and the USB interface may be a standard USB interface, a micro USB interface, or a Type-C interface.

In an embodiment of the present disclosure, based on the above solutions, after the terminal to be charged is connected to the adapter, handshake is performed with the adapter, that is, two-way communication is performed between the terminal to be charged and the adapter, to determine the charging mode that the adapter can support. For example, the terminal to be charged receives adaptation information sent by the adapter, the adaptation information including a charging mode supported by the adapter, and the charging terminal sends a control instruction to the adapter in response to the adaptation information, where the control instruction is used to control the adapter to charge the terminal to be charged in the charging mode supported by the terminal to be charged.

In an embodiment of the present disclosure, based on the above solutions, the first charging mode is determined when the voltage value of the converted charging voltage is the first voltage value. Here, the first voltage value may be 20V. The first charging mode is executed when it is determined that the adapter supports fast charging of the multiple cells after the handshake with the adapter, in which the first charging mode corresponds to the first charging circuit. When the voltage value of the converted charging voltage is the second voltage value, the second charging mode is determined. Here, the second voltage value may be 10V, and the second charging mode is executed when it is determined that the adapter supports only a single cell charging after the handshake with the adapter, in which the second charging mode corresponds to a second charging circuit. Switch may be performed between the first charging circuit and the second charging circuit by the conversion circuit.

At block S120, multiple cells connected in series are charged with the converted charging voltage.

In an embodiment of the present disclosure, when the converted charging voltage corresponds to the first charging mode, the converted charging voltage is applied to both ends of the multiple cells connected in series by the first charging circuit corresponding to the first charging mode. The input converted charging voltage is greater than the total voltage of the multiple cells connected in series.

In an embodiment of the present disclosure, based on the above solutions, when the first charging mode is determined after the handshake between the terminal to be charged and the adapter, only the first charging circuit corresponding to the first charging mode is turned on, and the charging circuits corresponding to the remaining charging modes are turned off. The first charging circuit applies the first voltage input by the adapter to both ends of the multiple cells connected in series in the terminal to be charged, and the voltage value of the first voltage is greater than the total voltage value of the multiple cells connected in series in the terminal to be charged.

In an embodiment of the present disclosure, when the converted charging voltage corresponds to the second charging mode, the converted charging voltage is applied to both ends of any single cell of the multiple cells connected in series by the second charging circuit corresponding to the second charging mode. The converted charging voltage is greater than the voltage of the single cell where the second voltage is applied, and the input converted charging voltage is less than the total voltage of the multiple cells connected in series.

In an embodiment of the present disclosure, based on the above solutions, when the second charging mode is determined after the handshake between the terminal to be charged and the adapter, only the second charging circuit corresponding to the second charging mode is turned on, and the charging circuits corresponding to the remaining charging modes are turned off. The second charging circuit applies the second voltage input by the adapter to both ends of any one single cell of the multiple cells connected in series in the terminal to be charged, and the voltage value of the second voltage is greater than the voltage value of the single cell where the voltage second voltage is applied, and the second voltage is less than the total voltage of the multiple cells connected in series in the terminal to be charged.

In an embodiment of the present disclosure, based on the above solutions, after charging the multiple cells connected in series with the converted charging voltage, the method further includes: determining a corresponding cut-off voltage based on parameters of any single cell of the multiple cells connected in series; performing voltage detection on any single cell of the multiple cells connected in series, to obtain a present voltage value of the single cell; and when the present voltage value of the single cell reaches the cut-off voltage of the single cell, charging the single cell through a plurality of charging stages until the voltage value of the single cell is raised to a preset target voltage value, in which the preset target voltage value is greater than the cut-off voltage of the single cell.

In an embodiment of the present disclosure, based on the above solutions, the battery is charged through the plurality of charging stages, in which each charging stage corresponds to one charging current, and the charging current corresponding to the charging stage is greater than the charging current corresponding to a next charging stage of the charging stage. In each charging stage, the battery is charged with the charging current corresponding to the charging stage until the voltage of the battery reaches the preset target voltage value, and the charging is stopped when the plurality of charging stages are completed.

In an embodiment of the present disclosure, by charging the single cell with a preset constant charging current until the voltage value of the single cell is raised to a preset target voltage value, the charging speed can be further increased by controlling the charging voltage and current, thereby shortening the charging duration of the constant voltage charging stage or removing the constant voltage charging stage. Therefore, the charging speed can be greatly improved compared to the charging process in the related art.

In an embodiment of the present disclosure, a limited voltage $V_n$ greater than the standard cut-off voltage of the single cell can be set, and a plurality of charging currents can be set as $I_1, I_2, I_3, \ldots, I_n$, where n≥1, $I_1 \geq I_2 \geq I_3 \ldots \geq I_n$. It should be understood that the above-mentioned limited voltage $V_n$ is related to the architecture and material of the multiple cells connected in series, and the current values of the charging currents $I_1, I_2, I_3, \ldots, I_n$ are also related to the architecture and material of the multiple cells connected in series. Preferably, if the standard cut-off voltage of the cell is $V_0$, $V_n$ can be set to $V_0+\Delta V$, for example, $\Delta V$ may be between 0.05V and 0.1V.

In an embodiment of the present disclosure, when the architecture of the multiple cells connected in series is determined, the capacity of the multiple cells connected in series is determined. According to the relation between the charging voltage, the charging current, the charging duration and the battery capacity, when the charging voltage after conversion is equal to the limited voltage $V_n$, the magnitude of the charging current at different stages can be determined. Specifically, the difference between two adjacent charging currents in $I_1, I_2, I_3, \ldots, I_n$, is $\Delta I$, for example, $\Delta I$ may be between 100 mA and 1 A.

In an embodiment of the present disclosure, regardless of whether the first charging mode or the second charging mode is used, when the voltage of any one single cell in the multiple cells connected in series is charged to the corresponding standard cut-off voltage, constant current charging is performed on the battery with the charging current $I_1$ until the voltage of the single cell reaches the limited voltage $V_n$. After the constant current charging with the current $I_1$ is stopped, the voltage of the single cell falls back. Therefore, constant current charging is performed on the single cell with the charging current $I_2$ until the voltage of the cell reaches the limited voltage $V_n$. The above steps are repeated until the single cell is charged to the limited voltage $V_n$ with the last charge current $I_n$, and the charging can be stopped at this time. Thus, by setting the limited voltage $V_n$ and the charging current at each stage, the constant voltage charging stage in the related art can be omitted, and the charging time is greatly saved.

In another embodiment of the present disclosure, based on the above solutions, regardless of whether the first charging mode or the second charging mode is used, when the voltage of any single cell in the multiple cells connected in series is charged to the corresponding standard cut-off voltage, constant current charging is performed on the battery with the charging current $I_1$ until the voltage of the single cell reaches the limited voltage $V_n$, and then constant current charging is performed on the single cell with the charging current $I_2$ until the voltage of the cell reaches the limited voltage $V_n$. The above steps are repeated until the single cell is charged to the limited voltage $V_n$ with the last charge current $I_n$, and then the single cell is charged with $V_n$ as the charging voltage. When the constant voltage charging reaches a preset charging time period, or the current for charging the single cell decreases to the preset current value, charging of the single cell is stopped. Thus, the duration of the constant voltage charging stage is reduced compared to the aforementioned related art, and in an embodiment of the present disclosure, since the limited voltage greater than the standard cut-off voltage is set, the duration of the constant voltage charging is reduced, which greatly saves the charging time.

In an embodiment of the present disclosure, when the multiple cells connected in series in the terminal to be charged are charged, the terminal to be charged detects the electric quantity of each cell, and when the electric quantities of the cells are unbalanced, an equalization module is configured to equalize the electric quantities of the cells and keep the electric quantities of respective cells consistent with each other, thereby ensuring the overall performance of the multiple cells and prolong the life of the cells.

In an embodiment of the present disclosure, based on the above solutions, the multiple cells in the terminal to be charged include at least a first cell and a second cell, a first electric quantity of the first cell and a second electric quantity of the second cell are obtained respectively. The ratio of the first electric quantity to the second electric quantity is compared with a preset threshold, to obtain a comparison result. When the comparison result is greater than 1 and greater than a preset first threshold, the electric quantity of the first cell is transferred to the second cell until the comparison result is less than the first threshold and greater than or equal to 1. When the comparison result is less than 1 and less than a preset second threshold, the electric quantity of the second cell is transferred to the first cell until the comparison result is greater than the second threshold and less than or equal to 1. For example, when the imbalance between the electric quantity of the first cell and the electric quantity of the second cell exceeds a preset threshold, the energy output from the first cell is coupled to the equalization module, and a charging current is formed in the equalization module, and the charging current is output to the second cell for charging the second cell, until the electric quantity of the first cell is balanced with the electric quantity of the second cell.

In an embodiment of the present disclosure, based on the above solutions, bidirectional communication with the adapter is performed to control a voltage or current input by the adapter in the first charging mode and control a voltage or current input by the adapter in the second charging mode. Specifically, by performing bidirectional communication with the adapter, the first voltage input by the adapter in the first charging mode is matched with a preset first expected value, or the second voltage input by the adapter in the second charging mode is matched with a preset second expected value.

In an embodiment of the present disclosure, the system of the terminal to be charged communicates with the adapter on the present total voltage or the present total electric quantity of the multiple cells, and adjusts the output voltage or output current of the adapter based on the present total voltage or the present total electric quantity of the multiple cells.

In an embodiment of the present disclosure, any one of the adapter and the device to be charged can initiate a bidirectional communication session as a master device, and accordingly, the other party can respond or reply as a slave device to the communication initiated by the master device.

In an embodiment of the present disclosure, after the act at block S120, the method further includes the following acts.

The total voltage of the multiple cells connected in series is reduced by a charge pump to a voltage required by a terminal system, and output to the terminal system.

In an embodiment of the present disclosure, based on the above solutions, reducing the total voltage of the multiple cells connected in series by the charge pump to the voltage required by the terminal system, includes the following act.

The multiple cells connected in series are switched into multiple cells connected in parallel by a first switching circuit; and the voltage outputted by the multiple cells connected in parallel is reduced to a voltage of a single cell in the multiple cells.

In an embodiment of the present disclosure, the above method further includes: separately outputting the voltage of any one single cell in the multiple cells connected in series by a second switching circuit, and equalizing electric quantities of respective cells in the multiple cells connected in series.

In an embodiment of the present disclosure, the system of the terminal to be charged generally requires a voltage of about 3.3 volts. For the terminal to be charged with the multiple cells connected in series, the voltage of the battery composed of the cells is 3.3*N volts, where N represents the number of cells and the voltage is much higher than the voltage required by the system. Therefore, embodiments of the present disclosure provide two power supply modes. A first mode is to switch the multiple cells connected in series into multiple cells connected in parallel, which may be implemented by a switch, so that the voltage of the battery can be reduced, and then a step-down chip is used to perform step-down for power supply. A second mode is to connect only one cell in the multiple cells connected in series for supplying power to the system. In order to ensure the overall performance of the battery, it is also necessary to maintain an electric quantity consistence between the cells in the multiple cells connected in series.

In an embodiment of the present disclosure, the multiple cells connected in series is switched into multiple cells connected in parallel by a first switching circuit, and the voltage outputted by the multiple cells connected in parallel is reduced to a voltage of a single cell in the multiple cells and outputted, or any one single cell in the multiple cells connected in series is separately outputted by a second switching circuit, and electric quantities of respective cells in the multiple cells connected in series are equalized.

In an embodiment of the present disclosure, in order to realize the simplification of the circuit, the voltage outputted by the multiple cells connected in parallel can be reduced by the charge pump, and the total voltage of the multiple cells can be directly reduced to 1/N of the present total voltage by the charge pump, in which N represents the number of cells contained in the multiple cells. The charge pump is mainly used to perform step-down with a switch tube and a capacitor. The capacitor basically does not consume extra energy. Therefore, with the charge pump, the power loss caused by the step-down process can be reduced. Specifically, the switch tube inside the charge pump controls the charging and discharging of the capacitor in a certain manner to lower the input voltage by a certain factor, thereby obtaining the required voltage.

In another embodiment of the present disclosure, the voltage after the step-down processing by the step-down circuit may have ripples, thereby affecting the power supply quality of the device to be charged. Embodiments of the present disclosure propose to directly extract the supply voltage from both ends of the single cell in the multiple cells, for supplying power to the components in the device to be charged. Since the voltage output from the cell is relatively stable, the power supply quality of the terminal system can be maintained.

Figure 2:
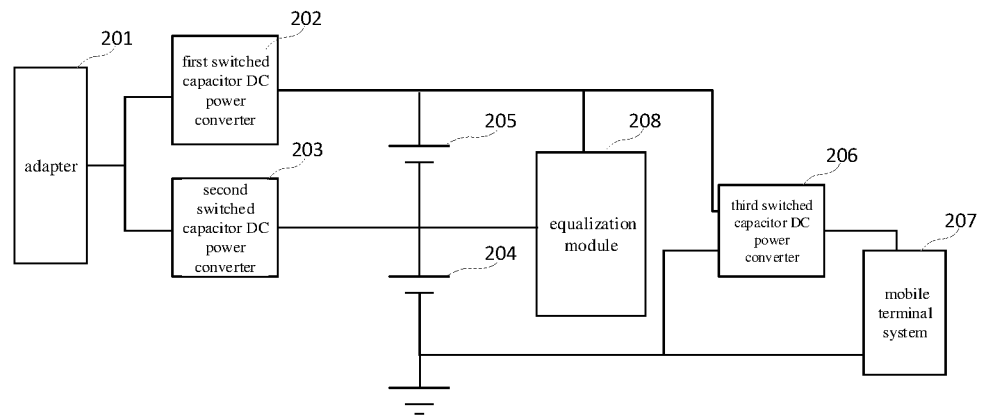
FIG. 2 is a schematic diagram illustrating charging two cells and supplying power to a terminal system implemented based on a switched-capacitor DC power converter according to an embodiment of the present disclosure.

FIG. 2 is a schematic diagram illustrating charging two cells and supplying power to a terminal system implemented based on a switched-capacitor DC power converter according to an embodiment of the present disclosure.

As illustrated in FIG. 2, according to an embodiment of the present disclosure, charging two cells and supplying power to the terminal system can be realized based on a switched-capacitor DC power converter module, which includes: an adapter 201, a first switched capacitor DC power converter 202, a second switched capacitor DC power converter 203, a first single cell 204, a second single cell 205, a third switched capacitor DC power converter 206, a mobile terminal system 207 and an equalization module 208.

The adapter 201 is configured to supply power to the mobile terminal.

The first switched capacitor DC power converter 202 is configured to execute a first charging mode.

The second switched capacitor DC power converter 203 is configured to execute a second charging mode.

The first single cell 204 is configured to connect with the second single cell 205 in series to form a series structure cell.

The second single cell 205 is configured to connect with the first single cell 204 in series to form a series structure cell.

The third switched capacitor DC power converter 206 is configured to half the voltage outputted by the series structure cell, for supplying power to the mobile terminal system.

The mobile terminal system 207 is configured to control an output of the adapter and implement related functions of the mobile terminal.

The equalization module 208 is configured to equalize an electric quantity between the first single cell 204 and the second single cell 205.

In an embodiment of the present disclosure, when the inserted adapter 201 supports fast charging of two cells, for example, the adapter 201 can output 20V voltage, the first switched capacitor DC power converter 202 works for series charging of the two cells, and the second switched capacitor DC power converter does not work. During the charging process, the mobile terminal system 207 performs bidirectional communication with the adapter 201 to adjust the output voltage or current of the adapter 201, to ensure that the voltage applied to the first single cell 204 and the second single cell 205 or the current entering the cell is the preset desired value. If the unbalanced state of the first single cell 204 and the second single cell 205 exceeds a preset first threshold during the charging process, the equalization module 208 starts to work, and when the unbalanced state of the first single cell 204 and the second single cell 205 is less than the preset first threshold, the equalization module 208 stops working.

In an embodiment of the present disclosure, when the inserted adapter 201 only supports fast charging of single cell, for example, the adapter 201 can output a maximum voltage of 10V, the second switched capacitor DC power converter 203 works to charge the first cell, and the first switched capacitor DC power converter 202 does not work. During the charging process, the equalization module 208 moves a portion (usually half) of the energy provided by the adapter 201 to the second single cell 205, thus ensuring that the unbalanced state of the first single cell 204 and the second single cell 205 is less than a preset second threshold. During the charging process, the mobile terminal system 207 performs bidirectional communication with the adapter 201 to adjust the output voltage or current of the adapter 201, to ensure that the voltage applied to the first single cell 204 and the second single cell 205 or the current entering the cell is the preset desired value.

In an embodiment of the present disclosure, the requirement of the mobile terminal system on the voltage is generally about 3.3V. However, taking two cells as an example, if they are connected in series, the voltage of the cells reaches 4.3+4.3=8.6V, which is much higher than the required voltage of the system. Therefore, an embodiment of the present disclosure proposes two power supply modes: (1) switching the multiple cells connected in series into multiple cells connected in parallel, which may be implemented by switch-on of the switch tubes, so that the voltage of the cells can be lowered, and then the third switch capacitor DC power converter 206 is used to lower the voltage for power supply; (2) only one cell is used for power supply, and the electric quantities of the cells are kept consistent with each other.

It should be noted that with respect to the specific steps for charging two cells and supplying power to the terminal system based on the switched-capacitor DC power converter module according to embodiments of the present disclosure, reference may be made to the charging method for multiple cells of the first aspect, which is not elaborated here.

It should be noted that the above description is only preferred embodiments of the present disclosure and is not intended to limit the scope of the present disclosure.

The apparatus embodiments of the present disclosure are described below and can be used to carry out the above-described charging method for multiple cells.

Figure 3:
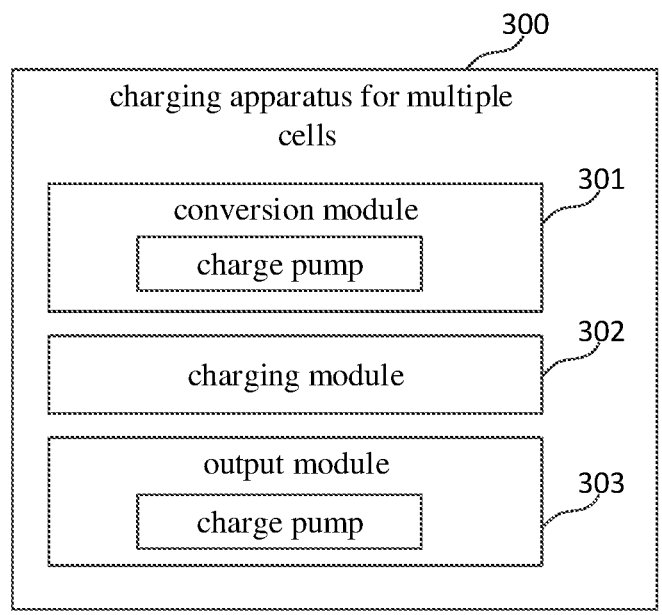
FIG. 3 is a block diagram of a charging apparatus for multiple cells according to an embodiment of the present disclosure.

FIG. 3 is a block diagram of a charging apparatus for multiple cells according to an embodiment of the present disclosure.

As illustrated in FIG. 3, the charging apparatus for multiple cells 300 includes: a conversion module 301, and a charging module 302.

The conversion module 301 is configured to convert a received charging voltage to obtain a converted charging voltage.

The charging module 302 is configured to charge the multiple cells connected in series with the converted charging voltage.

In an embodiment of the present disclosure, the conversion module may be implemented by a charge pump or a switched-capacitor DC power converter.

In an embodiment of the present disclosure, the charging apparatus further includes an output module 303.

The output module 303 is configured to reduce a total voltage of the multiple cells connected in series by the charge pump to a voltage required by a terminal system, and output the voltage to the terminal system.

In an embodiment of the present disclosure, the output module 303 is configured to: switch the multiple cells connected in series into multiple cells connected in parallel by a first switching circuit; and reduce the voltage outputted by the multiple cells connected in parallel to a voltage of a single cell in the multiple cells and output the voltage.

In an embodiment of the present disclosure, the output module 303 is configured to: separately output any one single cell in the multiple cells connected in series by a second switching circuit, and equalize electric quantities of respective cells in the multiple cells connected in series.

In an embodiment of the present disclosure, the output module 303 may be implemented by a charge pump or a switched-capacitor DC power converter.

In an embodiment of the present disclosure, the charge pump or the switched-capacitor DC power converter is configured to generate an output voltage greater than an input voltage, or generate a negative output voltage. For example, the above conversion module generates the output voltage greater than the input voltage through the charge pump, for charging the multiple cells connected in series. Since the power supply requirements of the system is generally 5V, and the total voltage of the multiple cells connected in series is much higher than 5V, the output module can reduce the total voltage of the multiple cells connected in series to 5V through the charge pump, for supplying power to the system.

In an embodiment of the present disclosure, as illustrated in FIG. 2, the conversion module 301 may include the first switched capacitor DC power converter 202 and the second switched capacitor DC power converter 203, and after the voltage output by the adapter 201 is converted, the first charging mode or the second charging mode is executed. When the first charging mode is performed, the second switched capacitor DC power converter 203 is in an off state, and when the second charging mode is performed, the first switched capacitor DC power converter 202 is turned off.

In an embodiment of the present disclosure, as illustrated in FIG. 2, when the first charging mode is executed, the first switched capacitor DC power converter 202 applies the charging voltage to both ends of the cell 205 and the cell 204 connected in series. At this time, the first switched capacitor DC power converter 202 converts the charging voltage outputted by the adapter 201, such that the charging voltage is greater than the total voltage of the cell 205 and the cell 204 connected in series.

In an embodiment of the present disclosure, as illustrated in FIG. 2, when the second charging mode is executed, the second switched capacitor DC power converter 203 directly applies the charging voltage to both ends of the cell 204, and transfers the power in the cell 204 to the cell 205 through the equalization module 208, for realizing charging of the cell 205 and the cell 204 connected in series.

In an embodiment of the present disclosure, as illustrated in FIG. 2, the output module 303 may be the third switched capacitor DC power converter 206 connected to both ends of the cell 205 and the cell 204 for reducing the total voltage of the cell 205 and the cell 204 connected in series, and outputting the reduced voltage to the mobile terminal system 207.

The respective functional modules of the charging apparatus for multiple cells according to the example embodiments of the present disclosure correspond to the steps of the example embodiments of the charging method for multiple cells described above. Therefore, for details not disclosed in the apparatus embodiments of the present disclosure, reference may be made to the above-described embodiments of the charging method for multiple cells according to the present disclosure.

Figure 4:
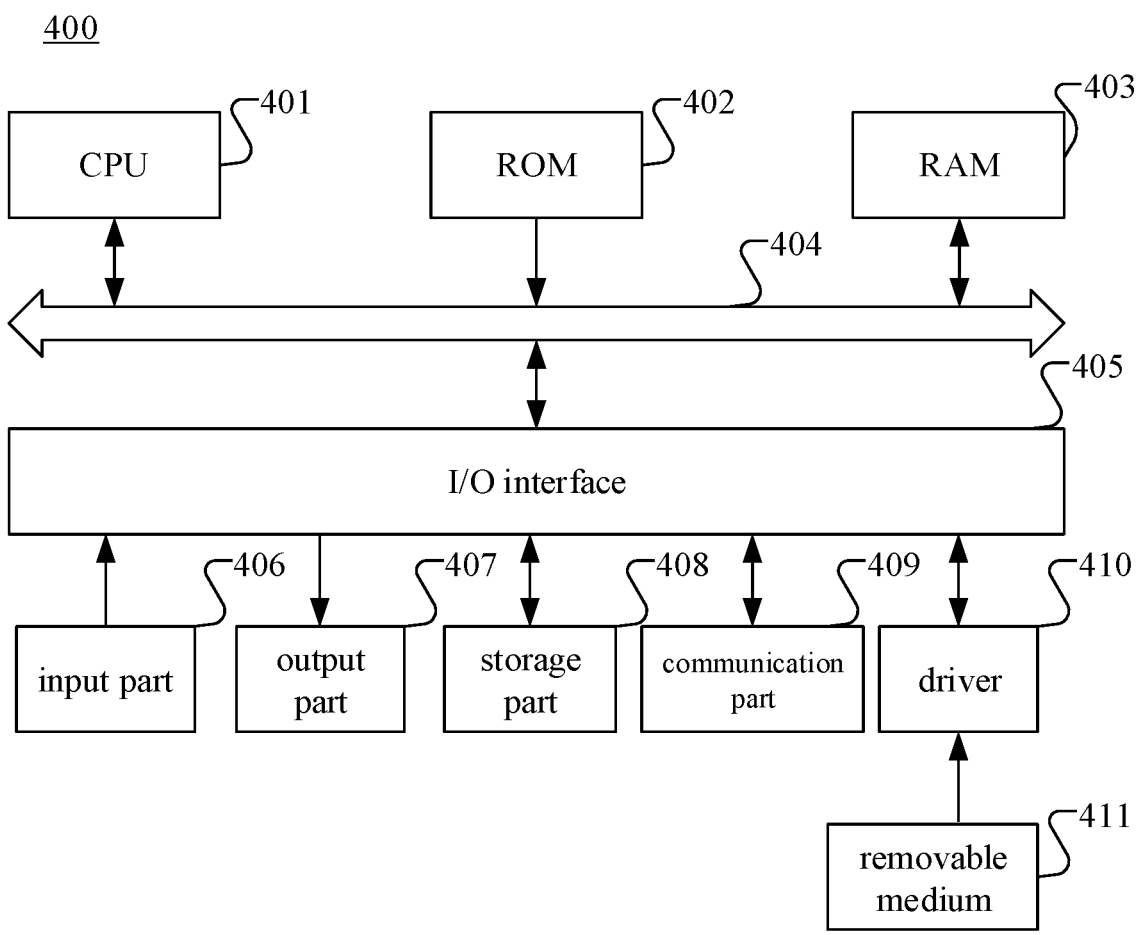
FIG. 4 is a block diagram of a computer system in an electronic device suitable for use in implementing embodiments of the present disclosure.

FIG. 4 is a block diagram of a computer system 400 in an electronic device suitable for use in implementing embodiments of the present disclosure. The computer system 400 of the electronic device shown in FIG. 4 is merely an example and should not impose any limitation on the function and scope of use of the embodiments of the present disclosure.

As illustrated in FIG. 4, the computer system 400 includes a central processing unit (CPU) 401, that can perform various appropriate actions and processes according to a program stored in a read only memory (ROM) 402 or loaded from a storage portion 408 into a random access memory (RAM) 403. In the RAM 403, various programs and data required for system operation are also stored. The CPU 401, the ROM 402, and the RAM 403 are connected to each other through a bus 404. An input/output (I/O) interface 405 is also coupled to the bus 404.

The following components are connected to the I/O interface 405: an input part 406 including a keyboard, a mouse and the like; an output part 407 including a cathode ray tube (CRT), a liquid crystal display (LCD), a speaker and the like; a storage part 408 including a hard disk and the like; and a communication part 409 including a network interface card such as a local area network (LAN) card, and a modem. The communication part 409 performs communication processing via a network such as the Internet. A driver 410 is also coupled to the I/O interface 405 as needed. A removable medium 411, such as a magnetic disk, an optical disk, a photomagnetic disk, and a semiconductor memory, is mounted on the driver 410 as needed, so that a computer program read therefrom can be installed into the storage part 408 as needed.

Specifically, the processes described above with reference to the flowcharts may be implemented by a computer software program according to an embodiment of the present disclosure. For example, embodiments of the present disclosure include a computer program product including a computer program carried on a computer readable medium, the computer program including program codes for executing the method illustrated in the flowchart. In such an embodiment, the computer program can be downloaded and installed from the network via the communication part 409, and/or installed from the removable medium 411. When the computer program is executed by the central processing unit (CPU) 401, the above-described functions defined in the system of the present disclosure are executed.

It should be noted that the computer readable medium may be a computer readable signal medium or a computer readable storage medium or any combination of the above two. The computer readable storage medium may be, but is not limited to, for example, an electrical, magnetic, optical, electromagnetic, infrared, or semiconductor system, apparatus, component or any combination thereof. Specific examples of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In the present disclosure, the computer readable storage medium may be any tangible medium including or storing programs. The programs may be used by an instruction execution system, apparatus or device, or used in connection therewith. In the present disclosure, the computer readable signal medium may include a data signal propagating in baseband or as part of a carrier, which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction execution system, apparatus or device, or used in connection therewith. The program codes stored on the computer readable medium may be transmitted using any appropriate medium, including but not limited to wireless, wireline, optical fiber cable, RF, or any suitable combination thereof.

The flowchart and block diagrams in the drawings illustrate the architecture, functionality and operation of possible implementations of systems, methods and computer program products according to various embodiments of the present disclosure. In this regard, each block of the flowchart or block diagrams can represent a module, a program segment, or a portion of codes that includes one or more executable instructions for implementing specified logic function. It should also be noted that in some alternative implementations, the functions noted in the blocks may also occur in a different order than that illustrated in the drawings. For example, two successively represented blocks may in fact be executed substantially in parallel, and may be executed in the reverse order, depending upon the functionalities involved. It is also noted that each block of the block diagrams or flowcharts, and combinations of blocks in the block diagrams or flowcharts, can be implemented by a dedicated hardware-based system that performs the specified function or operation, or can be implemented with a combination of dedicated hardware and computer instructions.

The units involved in the embodiments of the present disclosure may be implemented by software or by hardware, and the described units may also be disposed in the processor. The names of these units do not in any way constitute a limitation on the units themselves.

In another aspect, the present disclosure further provides a computer readable medium, which may be included in an electronic device described in the above embodiments, or may be separately present without being assembled into the electronic device. The computer readable medium carries one or more programs, and when the one or more programs are executed by the electronic device, the electronic device is caused to implement the charging method for multiple cells as in the above embodiments.

For example, as illustrated in FIG. 1, the electronic device described above can implement the act at block S110, converting a received charging voltage to obtain a converted charging voltage, and the act at block S120, charging multiple cells connected in series with the converted charging voltage.

It should be noted that although several modules or units of equipment for action execution are mentioned in the detailed description above, such division is not mandatory. In fact, the features and functions of two or more modules or units described above may be embodied in one module or unit according to the embodiments of the present disclosure. Conversely, the features and functions of one module or unit described above may be further divided into multiple modules or units.

Through the description of the above embodiments, those skilled in the art readily understood that the example embodiments described herein may be implemented by software or by software in combination with necessary hardware. Therefore, the technical solution according to embodiments of the present disclosure may be embodied in the form of a software product, which may be stored in a non-volatile storage medium (which may be a CD-ROM, a USB flash drive, and a mobile hard disk) or on a network, and includes several instructions to cause a computing device (which may be a personal computer, a server, a touch terminal, or a network device) to perform the method according to the embodiments of the present disclosure.

Other embodiments of the present disclosure are apparent to those skilled in the art after considering the specification and practicing the disclosure here. The present disclosure is intended to cover any variations, uses, or adaptations of the present disclosure, which are in accordance with the general principles of the present disclosure and include common knowledge or conventional technical means in the art that are not disclosed in the present disclosure. The specification and examples are to be considered as illustrative only, and the true scope and spirit of the present disclosure is indicated by the appending claims.

It should be understood that, the present disclosure is not limited to the exact structure described above and shown in the attached drawings and may undergo various modifications and changes without departing from its scope. The scope of the present disclosure is limited only by the attached claims.

What is claimed is:

1. A method of charging for multiple cells, comprising:
    converting a received charging voltage to obtain a converted charging voltage;
    charging multiple cells connected in series with the converted charging voltage;
    determining a charging mode as a first charging mode or a second charging mode according to the converted charging voltage, wherein the converted charging voltage corresponding to the first charging mode is greater than the converted charging voltage corresponding to the second charging mode;
    in a case of the charging mode being the first charging mode, applying the converted charging voltage to both ends of the multiple cells connected in series by a first charging circuit corresponding to the first charging mode, wherein the converted charging voltage is greater than a total voltage of the multiple cells connected in series; and
    in a case of the charging mode being the second charging mode, applying the converted charging voltage to both ends of any single cell of the multiple cells connected in series by a second charging circuit corresponding to the second charging mode, wherein the converted charging voltage is greater than a voltage of the single cell, and the converted charging voltage is less than the total voltage of the multiple cells connected in series.

2. The method according to claim 1, wherein converting the received charging voltage to obtain the converted charging voltage, comprises:
    converting the received charging voltage by a charge pump, to obtain the converted charging voltage.

3. The method according to claim 1, further comprising:
    obtaining charging parameters of the multiple cells connected in series, wherein the charging parameters comprise at least a voltage and a charging current of each single cell; and
    feedbacking the charging parameters to a power supply device, wherein the charging parameters are configured to instruct the power supply device to adjust at least one of an output voltage or an output current to meet a voltage and current required by the multiple cells connected in series.

4. The method according to claim 1, wherein a first charging mode is determined when a voltage value of the converted charging voltage is a first voltage value, and wherein a second charging mode is determined when the voltage value of the converted charging voltage is a second voltage value, in which the first voltage value is greater than the second voltage value.

5. The method according to claim 1, wherein charging the multiple cells connected in series with the converted charging voltage, comprises:
    determining a corresponding cut-off voltage based on cell parameters of any single cell of the multiple cells connected in series;
    performing voltage detection on any single cell of the multiple cells connected in series, to obtain a present voltage value of the single cell;
    when the present voltage value of the single cell reaches the cut-off voltage of the single cell, charging the single cell through a plurality of charging stages, wherein each charging stage corresponds to one charging current, and the charging current corresponding to the charging stage is greater than the charging current corresponding to a next charging stage of the charging stage, the single cell is charged with the charging current corresponding to respective charging stage in the respective charging stage until the voltage of the single cell reaches a preset target voltage value; and
    when the plurality of charging stages are completed, stopping charging.

6. The method according to claim 1, wherein charging the multiple cells connected in series with the converted charging voltage, comprises:
    determining a corresponding cut-off voltage based on cell parameters of any single cell of the multiple cells connected in series;

performing voltage detection on any single cell of the multiple cells connected in series, to obtain a present voltage value of the single cell;

when the present voltage value of the single cell reaches the cut-off voltage of the single cell, charging the single cell through a plurality of charging stages, wherein each charging stage corresponds to one charging current, and the charging current corresponding to the charging stage is greater than the charging current corresponding to a next charging stage of the charging stage, the single cell is charged with the charging current corresponding to respective charging stage in the respective charging stage until the voltage of the single cell reaches a preset target voltage value; and performing constant voltage charging on the single cell with the preset target voltage value, and stopping charging when the charging current reaches a preset target constant voltage charging cut-off current or a charging duration reaches a preset time period.

7. The method according to claim 1, further comprising: equalizing electric quantities of respective cells in the multiple cells connected in series.

8. The method according to claim 7, wherein the multiple cells comprise at least a first cell and a second cell, and equalizing the electric quantities of respective cells in the plurality of multiple cells connected in series comprises:

obtaining a first electric quantity of the first cell and a second electric quantity of the second cell, respectively;

comparing a ratio of the first electric quantity to the second electric quantity with a preset threshold, to obtain a comparison result;

when the comparison result is greater than 1 and greater than a preset first threshold, transferring the electric quantity of the first cell to the second cell until the comparison result is less than the first threshold and greater than or equal to 1; and when the comparison result is less than 1 and less than a preset second threshold, transferring the electric quantity of the second cell to the first cell until the comparison result is greater than the second threshold and less than or equal to 1.

9. The method according to claim 4, further comprising: performing bidirectional communication with an adapter to control a voltage or a current input by the adapter in the first charging mode and control a voltage or a current input by the adapter in the second charging mode.

10. The method according to claim 1, further comprising: reducing a total voltage of the multiple cells connected in series by a charge pump to a voltage required by a terminal system, and outputting the voltage required by the terminal system to the terminal system.

11. The method according to claim 10, wherein outputting the voltage required by the terminal system to the terminal system, comprises:

switching the multiple cells connected in series into multiple cells connected in parallel by a first switching circuit; and reducing the voltage outputted by the multiple cells connected in parallel to the voltage of a single cell in the multiple cells and outputting the voltage of the single cell.

12. The method according to claim 10, wherein outputting the voltage required by the terminal system to the terminal system, comprises:

separately outputting the voltage of any single cell in the multiple cells connected in series by a second switching circuit, and equalizing electric quantities of respective cells in the multiple cells connected in series.

13. A charging apparatus for multiple cells, comprising:
a processor; and
a memory, configured to store instructions executable by the processor,
wherein the processor is configured to:
convert a received charging voltage to obtain a converted charging voltage;
charge the multiple cells connected in series with the converted charging voltage;
determine a charging mode as a first charging mode or a second charging mode according to the converted charging voltage, wherein the converted charging voltage corresponding to the first charging mode is greater than the converted charging voltage corresponding to the second charging mode;
in a case of the charging mode being the first charging mode, the converted charging voltage is applied to both ends of the multiple cells connected in series by a first charging circuit corresponding to the first charging mode, wherein the converted charging voltage is greater than a total voltage of the multiple cells connected in series; and
in a case of the charging mode being the second charging mode, the converted charging voltage is applied to both ends of any single cell of the multiple cells connected in series by a second charging circuit corresponding to the second charging mode, wherein the converted charging voltage is greater than a voltage of the single cell, and the converted charging voltage is less than the total voltage of the multiple cells connected in series.

14. An electronic device, comprising:
a first cell and a second cell connected in series;
a conversion circuit, configured to receive a charging voltage from an adapter, convert the charging voltage to obtain a converted charging voltage, and output the converted charging voltage to the first cell and the second cell; and
an output circuit, configured to reduce a total voltage outputted by the first cell and the second cell to a desired voltage of a terminal system of the electronic device, and output the desired voltage to the terminal system,
wherein the conversion circuit is further configured to:
determine a charging mode as a first charging mode or a second charging mode according to the converted charging voltage, wherein the converted charging voltage corresponding to the first charging mode is greater than the converted charging voltage corresponding to the second charging mode;
in a case of the charging mode being the first charging mode, apply the converted charging voltage to both ends of the first cell and the second cell connected in series by a first charging circuit corresponding to the first charging mode, wherein the converted charging voltage is greater than a total voltage of the first cell and the second cell connected in series;
in a case of the charging mode being the second charging mode, apply the converted charging voltage to both ends of any single cell of the first cell and the second cell connected in series by a second charging circuit corresponding to the second charging mode, wherein the converted charging voltage is greater than a voltage of the single cell, and the converted charging voltage is less than the total voltage of the first cell and the second cell connected in series.

15. The electronic device according to claim 14, further comprising:
an equalization circuit, configured to equalize an electric quantity of the first cell and an electric quantity of the second cell.

16. The electronic device according to claim 15, wherein the equalization circuit is configured to start working when a ratio of the electric quantity of the first cell to the electric quantity of the second cell is greater than a preset threshold, and stop working when the ratio of the electric quantity of the first cell to the electric quantity of the second cell is less than the preset threshold.

17. The electronic device according to claim 14, wherein the conversion circuit comprises a first switched capacitor DC power converter and a second switched capacitor DC power converter,
when the adapter supports fast charging of only one of the first cell and the second cell, the first switched capacitor DC power converter does not work and the second switched capacitor DC power converter works, for charging the first cell; and
when the adapter supports fast charging of both the first cell and the second cell, the first switched capacitor DC power converter works and the second switched capacitor DC power converter does not work, for charging both the first cell and the second cell.

18. The electronic device according to claim 14, wherein the output circuit comprises a charge pump or a switched capacitor DC power converter.

* * * * *